No. 883,155. PATENTED MAR. 24, 1908.
G. WESTINGHOUSE.
SHAFT PACKING.
APPLICATION FILED MAR. 5, 1906.
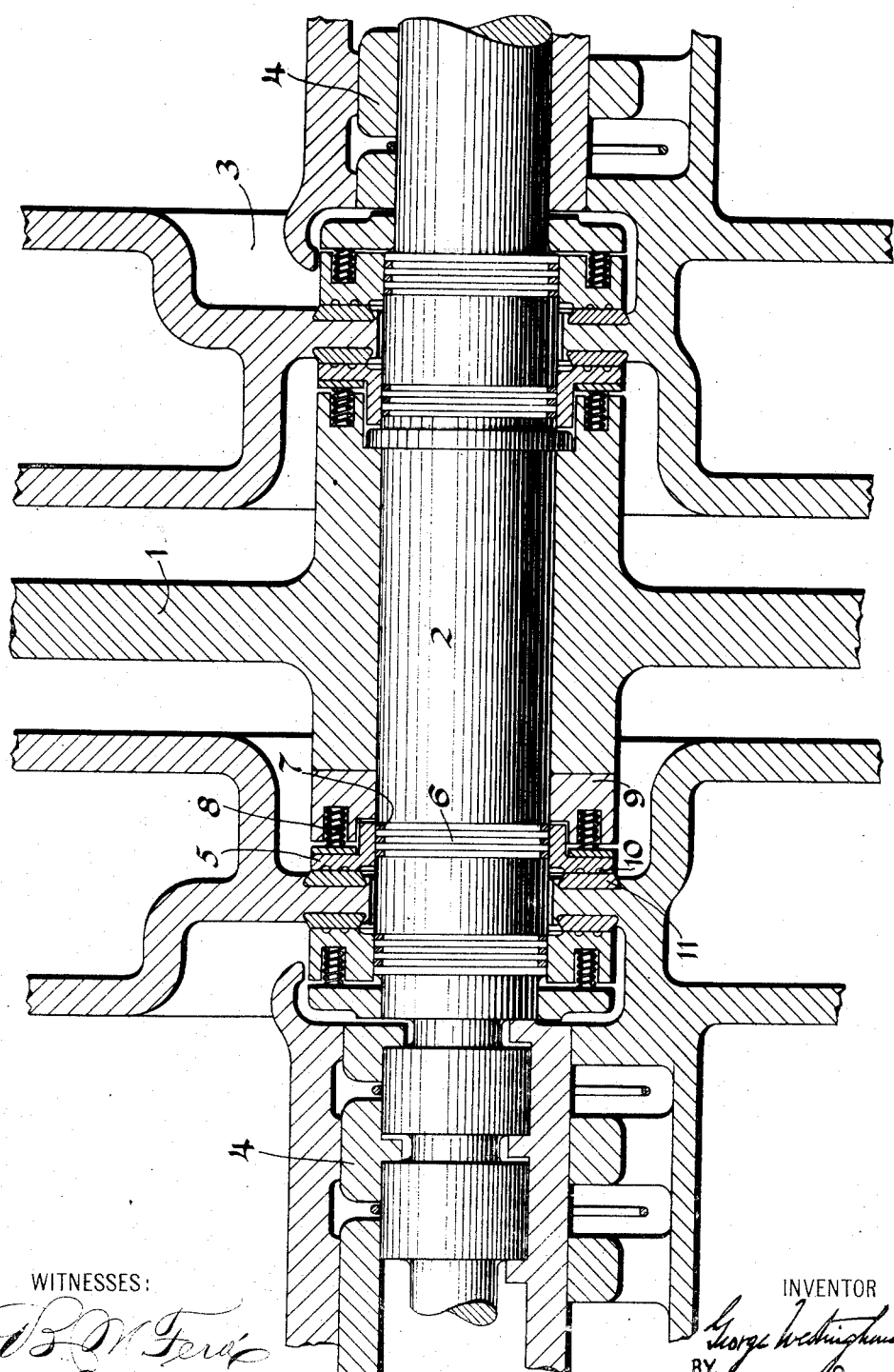
WITNESSES:
INVENTOR
ATTORNEY

UNITED STATES PATENT OFFICE.

GEORGE WESTINGHOUSE, OF PITTSBURG, PENNSYLVANIA, ASSIGNOR TO THE WESTINGHOUSE MACHINE COMPANY, A CORPORATION OF PENNSYLVANIA.

SHAFT-PACKING.

No. 883,155.

Specification of Letters Patent.

Patented March 24, 1908.

Original application filed February 12, 1904, Serial No. 193,354. Divided and this application filed March 5, 1906. Serial No. 304,388.

*To all whom it may concern:*

Be it known that I, GEORGE WESTINGHOUSE, a citizen of the United States, and a resident of Pittsburg, in the county of Allegheny and State of Pennsylvania, have invented new and useful Shaft-Packing, of which the following is a specification, this application being a division of an application filed by me on February 12, 1904, Serial No. 193,354.

This invention relates to packing for rotatable shafts and as an object has the production of a simple and efficient packing especially adaptable for use in connection with steam or other elastic fluid turbines, and in the drawing I have shown it as applied to the shaft of a steam turbine.

The rotor 1 of the turbine is mounted on shaft 2 which projects through openings in casing 3 and is journaled in suitable bearings 4.

The invention is shown as applied to a horizontal turbine, although, of course, it is applicable to a turbine having a vertical shaft, or a shaft disposed in any other position.

Packings are shown on the inside and outside of the casing on each side of the turbine, between the shaft and casing, and, since they are the same in all essential particulars, a description of one is considered sufficient for the purpose of this application.

Mounted on and freely movable lengthwise of the shaft is a packing ring 5 substantially L-shaped in cross section. Between ring 5 and the shaft, which at that point is grooved as shown at 6, packing material 7 of any suitable kind is interposed, whereby a fluid-tight joint between the ring and the shaft is maintained. Means are provided for urging the ring lengthwise of the shaft, consisting preferably of springs 8 housed in sockets in a collar 9, which is rigidly secured to the shaft. The outer face of the packing ring is faced off in a plane of revolution and concentric water grooves 10 are turned therein. Located within an undercut annular slot formed in the casing concentric with the shaft is a wearing plate 11 which may be formed of babbitt or any other suitable material. The springs 8 are designed to hold the wearing face of packing ring 5 in packing contact with wearing plate 11.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:

1. In combination with a turbine and its shaft, a packing comprising an L-shaped ring surrounding said shaft, a stationary ring surrounding said shaft and mounted on the casing of said turbine, means for yieldingly forcing said L-shaped ring into contact with said stationary ring and a plurality of split rings located between said shaft and said L-shaped ring.

2. In combination with a turbine, a shaft, a packing comprising a rotatable ring surrounding said shaft, a stationary ring surrounding said shaft and secured to said casing, a spring for forcing said rotatable ring longitudinally of said shaft into contact with said stationary ring and a plurality of packing rings mounted on said shaft and located between said shaft and said rotatable ring.

3. In combination with a turbine and its shaft, a packing comprising a floating ring surrounding said shaft, a stationary ring surrounding said shaft and secured to the casing of said turbine, means for yieldingly forcing said floating ring into contact with said stationary ring and a plurality of packing rings between said floating ring and said shaft.

4. In combination with a turbine and its shaft, a packing comprising a floating ring surrounding said shaft, a stationary ring surrounding said shaft and secured to said casing, a plurality of springs yieldingly forcing said floating ring into contact with said stationary ring and a plurality of rotatable packing rings mounted on said shaft and located between it and said floating ring.

In testimony whereof, I have hereunto subscribed my name this 1st day of March 1906.

GEO. WESTINGHOUSE.

Witnesses:
WM. H. CAPEL,
H. C. TENER.